United States Patent [19]

Imamura

[11] 4,264,315

[45] Apr. 28, 1981

[54] POWER TRANSMISSION V-BELT AND METHOD OF MANUFACTURING

[75] Inventor: Junji Imamura, Kobe, Japan

[73] Assignee: Mitsuboshi Belting Ltd., Kobe, Japan

[21] Appl. No.: 55,835

[22] Filed: Jul. 9, 1979

[30] Foreign Application Priority Data

Dec. 16, 1978 [JP] Japan .................................. 53/156029

[51] Int. Cl.³ .......................... F16G 5/08; B29H 7/22
[52] U.S. Cl. ..................................... 474/264; 156/142;
474/265
[58] Field of Search .......................... 74/232, 233, 234;
156/137, 138, 139, 140, 142; 474/260, 264, 265

[56] References Cited

U.S. PATENT DOCUMENTS

| | | | |
|---|---|---|---|
| 1,432,973 | 10/1922 | Delzell | 156/142 |
| 1,917,548 | 7/1933 | Russell | 74/234 |
| 2,726,976 | 12/1955 | Waugh | 74/233 |
| 3,151,491 | 10/1964 | Case | 74/223 X |
| 3,564,933 | 2/1971 | Clinkenbeard | 74/233 |
| 3,830,113 | 8/1974 | Bruns | 74/233 X |
| 3,869,933 | 3/1975 | Dorf | 474/265 |
| 4,131,030 | 12/1978 | White, Jr. | 74/232 |

FOREIGN PATENT DOCUMENTS 452656 11/1948 Canada ..................................... 74/232

*Primary Examiner*—C. J. Husar
*Assistant Examiner*—Conrad Berman
*Attorney, Agent, or Firm*—Sughrue, Rothwell, Mion, Zinn and Macpeak

[57] ABSTRACT

A raw edge type endless power transmission V-belt having a first rubber layer, a second rubber layer, an adhesion rubber layer in which a tensile member is embedded in the form of a layer and which provided between said first and second rubber layer. The top and bottom surfaces of the V-belt are covered with cover fabrics. The layer of the tensile member is obtained by spirally winding a continuous cord, and a line connecting the centers of the cords laterally of the V-belt is a part by 2 to 20% of the thickness of the V-belt from the center line of the V-belt. The V-belt is manufactured by (a) winding at least one ply of first bias fabric around a cylindrical mandrel; (b) winding a first rubber layer and a first adhesion rubber layer on the bias fabric; (c) spirally winding a continuous cord, in the form of a layer, on the first adhesion rubber layer; (d) winding a second adhesion rubber layer and a second rubber layer around the layer of the continuous cord; (e) winding at least one ply of second bias fabric around the second rubber layer, to obtain a belt sleeve, the number of plies of second bias fabric being equal to the number of plies of first bias fabric; (f) heating the belt sleeve under pressure; and (g) cutting the belt sleeve obliquely so that V-belts having a trapezoid section and V-belts having an inverted-trapezoid section are obtained alternately.

13 Claims, 9 Drawing Figures

U.S. Patent  Apr. 28, 1981  4,264,315
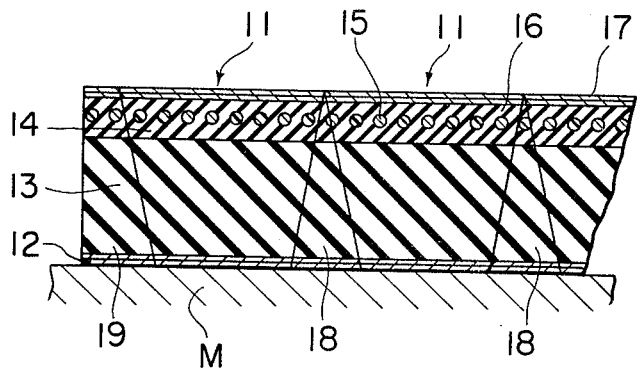
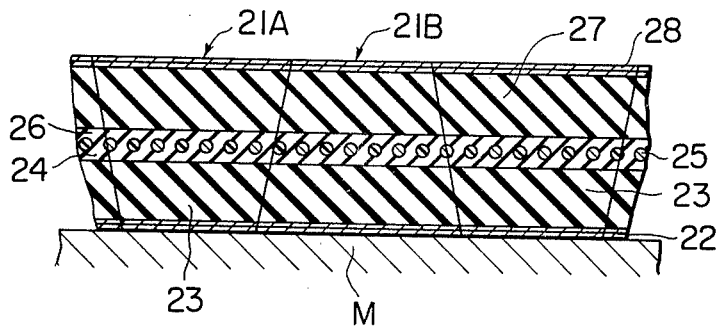
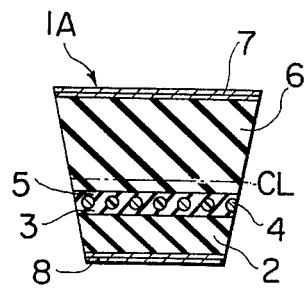
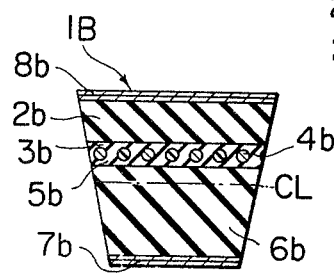
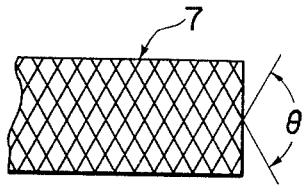
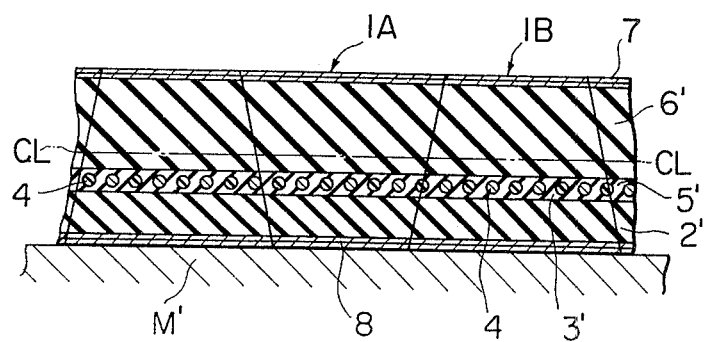

POWER TRANSMISSION V-BELT AND METHOD OF MANUFACTURING

BACKGROUND OF THE INVENTION

This invention relates to a raw edge type power transmission V-belt in which the tensile member in the form of a layer is displaced above or below the center line of the V-belt, and to a method of manufacturing the V-belt.

A conventional raw edge type V-belt is designated by reference numeral 11 in FIGS. 1 and 2. The conventional V-belt is, in general, manufactured according to a method in which, as shown in FIG. 1, one to several plies of rubbered bias fabric 12 are wound around a cylindrical drum or a metal mold M. A compression rubber layer 13 and an adhesion rubber layer 14 are bonded to the rubbered bias fabric 12 and a rope-shaped tensile member 15 low in elongation and high in strength is spirally wound in the form of a layer on the adhesion rubber layer 14. Another adhesion rubber layer 16 is bonded to the layer of the tensile member 15, and one to several plies of rubbered bias fabric 17 are bonded to the adhesion rubber layer 16 to obtain a belt sleeve. Then, after being heated under pressure, the belt sleeve is cut into raw edge type V-belts 11 having a predetermined width.

In this method, the belt sleeve is cut alternately obliquely as shown in FIG. 1. Therefore, the triangular material 18 between adjacent V-belts sections 11 and the end material 19 are scraps. This will increase the cost of the V-belt. Furthermore, since the tensile member 15 is embedded near the upper surface of the V-belt, the flexibility of the V-belt is reduced, and accordingly it is difficult to use the V-belt on a small diameter pulley. Thus, the conventional method is disadvantageous in these points.

In order to overcome these difficulties, another method has been proposed in the art. In the conventional method, as shown in FIG. 3, a tensile member 25 is provided along the center line of a V-belt with a cylindrical drum M being used as a mold. Adhesion rubber layers 26 and 24, compression rubber layers 27 and 23 and rubbered bias fabrics 28 and 22 are laid respectively on and under the tensile member 25 in succession, to obtain a belt sleeve. After being vulcanized, the belt sleeve is cut obliquely as shown in FIG. 3 so that V-belts having a trapezoid section and V-belts having an inverted-trapezoid section are alternately obtained. That is, a direct molded V-belt 21A as shown in FIG. 4, which can be used as it is, and an indirect molded V-belt 21B as shown in FIG. 5, which must be turned inside out before use, are alternately obtained, to reduce the number of scraps.

The method shown in FIG. 3 is superior to the method shown in FIG. 1 in that no triangular scraps 18 are created. Also, because the tensile member 15 is provided along the center line of the V-belt, the flexibility of the belt is improved, and accordingly the V-belt can be used with a small diameter pulley. However, the latter method is still disadvantageous in the following points: When the indirect molded V-belt 21B is turned inside out for use, the fabric layer 22, which was the lower part of the belt as view in FIG. 3, becomes the upper part of the belt and therefore the fabric 22 is elongated as much as $2 \pi h$. ($h$=the belt thickness)

Accordingly, although the direct molded V-belt is equal in dimension, configuration and structure to the indirect molded V-belt which has been turned inside out, they are different in operating characteristic as follows: When the two V-belts are run, the fabric 22 and the upper compression rubber layer 23 of the indirect molded V-belt 21B are elongated more that those of the direct molded V-belt 21A. Therefore, the fabric 22 and the upper compression rubber layer 23 of the indirect molded V-belt 21B are liable to be cracked. In addition, since the indirect molded V-belt 21B is harder than the direct molded V-belt 21A, heat is significantly generated in the indirect molded V-belt 21B and accordingly the serive life thereof is considerably shortened.

SUMMARY OF THE INVENTION

In view of the above-described difficulties accompanying a conventional raw edge type rubber V-belt which is manufactured by cutting a cylindrical belt sleeve into rings, an object of this invention is to provide a raw edge type V-belt whose flexibility and crack resistance are improved by displacing its tensile member above the center line of the V-belt when it is an indirect molded V-belt, and below the center line of the V-belt when it is a direct molded V-belt, and a method of manufacturing the V-belt. This and other objects of the invention are accomplished in a method of manufacturing a raw edge type endless power transmission V-belt, comprising the following steps: (a) winding at least one ply of first bias fabric around a cylindrical mandrel; (b) winding a first rubber layer and a first adhesion rubber layer on the bias fabric in the stated order; (c) spirally winding a continuous cord, in the form of a layer, on the first adhesion rubber layer; (d) winding a second adhesion rubber layer and a second rubber layer around the layer of the continuous cord in the stated order; (e) winding at least one ply of second bias fabric around the second rubber layer, to obtain a belt sleeve the number of plies of second bias fabric being equal to the number of plies of first bias fabric; (f) heating the belt sleeve under pressure; and (g) cutting the belt sleeve obliquely so that V-belts having a trapezoid section and V-belts having an inverted-trapezoid section are alternately obtained.

As a result, the thickness of the second rubber layer is larger than that of the first rubber layer. The center of the tensile member is inwardly displaced from the center line of the belt by 2 to 20% of the thickness of the belt.

BRIEF DESCRIPTION OF THE DRAWINGS

FIG. 1 is a sectional view of one example of a conventional method of manufacturing V-belts;

FIG. 2 is a cross-sectional view of a V-belt manufactured according to the method described with reference to FIG. 1;

FIG. 3 is a sectional view of another example of the conventional V-belt manufacturing method;

FIG. 4 and FIG. 5 are cross-sectional views of V-belts manufactured according to the method described with reference to FIG. 3;

FIG. 6 and FIG. 7 are sectional views of V-belts manufactured according to this invention;

FIG. 8 is a plan view of a bias fabric forming the top and bottom surfaces of the V-belt according to the invention, showing a cross angle $\theta$ formed by the warps and wefts of the bias fabric; and FIG. 9 is a sectional view of a method of manufacturing the V-belts according to the invention.

DETAILED DESCRIPTION OF THE INVENTION

A raw edge type V-belt according to this invention will now be described with reference to the accompanying drawings.

V-belts 1A and 1B shown in FIGS. 6 and 7 are a direct molded V-belt and an indirect molded V-belt which has been turned inside out, respectively. First, the direct molded V-belt shown in FIG. 6 will be described.

In FIG. 6, reference numeral 2 designates a first rubber layer made of natural rubber (NR) or styrene butadiene rubber (SBR) or a blend of NR and SBR, or a heat-proof synthetic rubber such as chloroprene rubber (CR), nitrile butadiene rubber (NBR) or a blend of CR and NBR, or natural rubber or synthetic rubber having characteristics equivalent to those of the above-described rubbers. Reference numerals 3 and 5 designates adhesion rubber layers equivalent in material to the first rubber layer 2. A roped-shaped tensile member 4 low in elongation and high in strength, which is made of polyester fibers or polyamide fibers subjected to thermal elongation and adhesion treatment is embedded between the adhesion rubber layers 3 and 5 in such a manner that the tensile member 4 is 2 to 20% of the belt thickness below the center line CL.

A second rubber layer 6 equal in material to the first rubber layer 2 is laid on the upper surface of the layer 5. A single or plural plies of cover fabrics 7 are provided on the upper surface of the rubber layer 6. Similarly a single or plural plies of cover fabrics 8 are provided on the lower surface of the rubber layer 2. A feature of this V-belt resides in the shifting of the layer of the tensile member 4 from the center line CL. If the distance between the layer of the tensile member 4 and the center line is shorter than 2% of the belt thickness, the layer of the tensile member 4 is too close to the center line CL.

In this case, no problems are caused with the direct molded V-belt. However, the indirect molded V-belt suffers from the problem of cracking because of the elongation of the first rubber layer 2b, as described before. On the other hand, if the distance is longer than 20% of the belt thickness, then the stretchability (flexibility) of the first rubber layer 6 is maintained sufficiently and the V-belt can be operated on a small diameter pulley. However, in this case the position of the tensile member 4 is too close to the bottom of the belt. Accordingly, the effective power transmission areas (or contact areas) of both sides of the belt are decreased; that is, the power transmission performance is lowered. Thus, it is most suitable for the layer of the tensile member 4 to be shifted 2 to 20% of the belt thickness below the center line CL.

Now, the indirect molded V-belt, which must be turned inside out before use, will be described with reference to FIG. 7. In FIG. 7, reference character 6b designates a first rubber layer which is equal in material to the second rubber layer 6 of the above-described direct molded V-belt 1A. Reference characters 5b and 3b designate adhesion rubber layers which are equal in material to the adhesion rubber layers 5 and 3. In contrast to the case of the above-described direct molded V-belt, a rope shaped tensile member 4b is embedded in the form of a layer between the adhesion rubber layers 5b and 3b in such a manner that the layer of the tensile member 4b is displaced 2 to 20% of the belt thickness above the center line CL. A second rubber layer 2b equal in material to the first rubber layer 2 of the direct molded V-belt 1A is laid on the upper surface of the layer of the tensile member 4b. Similar to the direct molded V-belt 1A, a single or plural plies of cover fabrics 7b are provided on the lower surface of the first rubber layer 6b, and a single or plural plies of cover fabrics 8b are provided on the upper surface of the second rubber layer 2b.

In the indirect molded V-belt 1B which is turned inside out to be used as if it were a direct molded V-belt, the layer of the tensile member 4b is displaced 2 to 20% of the belt thickness above the center line CL. The second rubber layer 2b and the top cover fabric 8b are elongated to some extent. However, since the layer of the tensile member 4b is above the center line, the indirect molded V-bet is advantageous in that the effective power transmission area of the side of the belt is larger than that of the direct molded V-belt. That is, the power transmission performance is improved, and the rubber layers are not cracked.

If the distance between the layer of the tensile member 4b and the center line CL is shorter than 2% of the belt thickness, the layer of the tensile member 4b is too close to the center line. In this case, the thickness of the second rubber layer 2b which is elongated when the belt is turned inside out is increased, and the second rubber layer 2b may be cracked. On the other hand, if the distance is longer than 20% of the belt thickness, the layer of the tensile member 4b is too close to the upper surface of the belt. This condition is similar to the case of the ordinary raw edge type V-belt 11 in FIG. 2. In this case, tension is applied to the tensile member 4b, and the flexibility of the belt is decreased. Accordingly, it is difficult to use the belt on a small diameter pulley.

It can be readily understood that, in the case also where the layer of the tensile member 4b is above the center line, the distance between the layer of the tensile member 4b and the center line should be 2 to 20% of the belt thickness.

As is clear from the above description, in the direct molded V-belt 1A and the indirect molded V-belt, the difficulties in stretchability, power transmission performance, etc. of these V-belts can be mutually cancelled by respectively displacing the layers of the tensile member 4 and 4b, 2 to 20% of the belt thickness, below and above the center line. Although the position of the layer of the tensile member 4 of the V-belt 1A is different from that of the V-belt 1B, both of the V-belts are excellent in flexibility and crack resistance. Moreover, they do not significantly suffer from the generation of heat during running. Thus, the service lives of the belts are much improved.

In order to improve the rigidity and wear-resistance of the raw edge type V-belt according to the invention, and to prevent the tensile members (4 or 4b) from being dropped by generation of heat, the first and second rubber layers (2 and 6, or 6b and 2b) may be made of rubber material reinforced with short fibers. The rubber material reinforced with short fibers can be obtained by mixing 5 to 30% by weight into 100% by weight of rubber.

In general, the V-belt is of the raw edge plain type. However, cogs may be formed at predetermined intervals in the upper surface and/or the lower surface of the belt in order to improve the flexibility of the belt.

A method of manufacturing the above-described direct and indirect molded V-belts according to the invention will now be described.

Referring to FIG. 9, a single or plural plies of cover fabrics are wound around a cylindrical drum or a metal mold M, and then a first rubber sheet 2' made of NR or SBR or a blend of them, a heat-proof synthetic rubber such as CR, NBR or a blend of them, or the above-described short-fiber reinforced rubber material is endlessly wound on the cover fabrics. Thereafter, an adhesion rubber sheet 3' about 0.3–1.0 mm in thickness is bonded to the first rubber sheet 2'. Then, a tensile member 4, 0.6–2.5 mm in diameter is spirally wound around the adhesion rubber sheet under a predetermined tension. The tensile member 4 is made of polyester fibers or polyamide fibers low in elongation and high in strength, which are subjected to adhesion treatment with isocyanates and RFL (resorchinol formalin latex) and to heat elongation treatment at a high temperature of 200° to 240° C. An adhesion rubber layer 5', 0.3 to 1.0 mm in thickness is wound around the layer of the tensile member 4. Then, a second rubber sheet 6' equal in material to the first rubber sheet 2' is endlessly wound around the adhesion rubber layer 5', to obtain an assembly.

The layer of the tensile member (4 or 4b) may be displaced from the center line CL by 2 to 20% of the belt thickness by changing the thicknesses of the first and second rubber layers in the above-described manufacturing process, i.e., by making the thickness of the first rubber layer smaller than the thickness of the second rubber layer. More specifically, a rubber sheet whose thickness is smaller than the thickness of the second rubber layer is used for the first rubber layer.

In the conventional V-belt in which the layer of the tensile member is provided along the center line, the thickness of the rubber layer on the layer of the tensile member is substantially equal to the thickness of the rubber layer under the layer of the tensile member.

The assembly thus obtained is subjected to vulcanization. This is a conventional step where the assembly together with the cylindrical drum M is placed in a vulcanizing container, and is then vulcanized for a predetermined period of time. Thereafter, the assembly is taken out of the vulcanizing container and a vulcanized molded V-belt blank is obtained.

The bias fabric provided on the upper surface or the lower surface of the belt is a rubbered fabric which obtained by coating a fabric with friction rubber or by heavily coating it with rubber. If, in the above-described manufacturing process, the continuous rubbered fabric is wound in a plurality of plies, then the number of joint parts can be reduced, and the work efficiency can be improved. The rubbered fabric is a wide cross angle bias fabric in which the warps and wefts form a cross angle of 90° to 150° degrees. The bias fabric is arranged in such a manner that the warps and wefts are extended obliquely with respect to the longitudinal direction of the belt, i.e., the circumferential direction of the cylindrical drum or the metal mold M.

Then, the molded V-belt is placed over a cylindrical mandrel covered with hard rubber, and is then cut obliquely in the conventional manner into several rings having a trapezoid section so that direct molded V-belts and indirect molded V-belts are alternately obtained. That is, the direct molded V-belt in which the layer of the tensile member is displaced 2 to 20% of the belt thickness below the center line as shown in FIG. 6 is obtained. Simultaneously, the indirect molded V-belt in which the layer of the tensile member is displaced 2 to 20% of the belt thickness above the center line as shown in FIG. 7 when it is turned inside out, is obtained. Thus, unlike the case of the conventional method described with reference to FIG. 1, the number of scraps can be considerably reduced.

Cogs may be formed in the upper surface and/or the lower surface of the V-belt (1A or 1B) manufactured according to the method of the invention. This is due in order to improve the flexibility.

As described above, in the V-belt (1A or 1B) according to the invention, the layer of the tensile member is provided between the first and second rubber layers in such a manner that it is 2 to 20% of the belt thickness above or below the center line. The short-fiber reinforced rubber material which is obtained by mixing short fibers in rubber material is employed as the first and second rubber layers. Therefore, the V-belt according to the invention has the following merits:

(1) The molded V-belt blank is cut into several rings so that V-belts having a trapezoid section and V-belts having an inverted-trapezoid section are alternately obtained. Therefore, the number of scraps which may be created during the cutting process is reduced.

(2) In the V-belts thus manufactured, the layer of the tensile member is above or below the center line. Because the direct molded V-belt can be used as is, it is sufficient in stretchability and flexibility. On the other hand, with the indirect molded V-belt, its upper compression rubber layer is elongated as much as $2\pi h$ (h=the belt thickness) when it is turned inside out. However, since the layer of the tensile member is 2 to 20% of the belt thickness above the center line, the thickness of the second rubber layer elongated is reduced as much.

Accordingly, when compared with the conventional V-belt having the layer of the tensile member along the center line and turned inside out before use, the upper part of the V-belt according to the invention is not significantly cracked. Furthermore, the direct and indirect molded V-belts according to the invention are substantially the same in service life and power transmission performance; that is, they are substantially equal to each other in operating characteristic.

What is claimed is:

1. In a raw edge type endless power transmission V-belt having a first rubber layer, a second rubber layer, an adhesion rubber layer with a tensile member embedded in the form of a layer and which provided between said first and second rubber layer, said belt having its top and bottom surfaces covered with cover fabrics, the improvement comprising;

said layer with said tensile member is obtained by spirally winding a continuous cord, and a line connecting the centers of said cords laterally of said V-belt is spaced from 2 to 20% of the thickness of said V-belt from the center line of said V-belt.

2. A V-belt as claimed in claim 1 wherein the same number of plies of said cover fabrics are laid in close contact with one another on the top and bottom surfaces of said V-belt.

3. A V-belt as claimed in claim 1, wherein each of said first and second rubber layer is a rubber layer reinforced with short fibers in such a manner that said short fibers extend in the lateral direction of said V-belt, said short fibers being selected from the group consisting of natural fibers and synthetic fibers.

4. A V-belt as claimed in claim 1, wherein said line connecting the centers of said cords laterally of said V-belt is positioned 2 to 20% of the thickness of said V-belt above the center line of said V-belt.

5. A V-belt as claimed in claim 1, wherein said line connecting the centers of said cords laterally of said V-belt is positioned 2 to 20% of the thickness of said V-belt below the center line of said V-belt.

6. A V-belt as claimed in claim 1, wherein said cover fabrics covering the top and bottom surfaces of said V-belt are bias fabrics, and said bias fabrics are laid in a single ply on the top and bottom surfaces of said V-belt, respectively.

7. A V-belt as claimed in claim 1 wherein said cover fabrics covering the top and bottom surfaces of said V-belt are bias fabrics laid in multiple plies on the top and bottom surfaces of said V-belt respectively.

8. A V-belt as claimed in claims 6 or 7, wherein said bias fabrics on the top and bottom surface of said V-belt are wide cross angle fabrics in which the wefts and warps form a cross angle of 90 to 150 degrees.

9. A method of manufacturing a raw edge type endless power transmission V-belt, comprising the steps of: (a) winding at least one ply of first bias fabric around a cylindrical mandrel; (b) winding a first rubber layer and a first adhesion rubber layer on said bias fabric in the stated order; (c) spirally winding a continuous cord, in the form of a layer, on said first adhesion rubber layer; (d) winding a second adhesion rubber layer and a second rubber layer around the layer of said continuous cord in the stated order; (e) winding at least one ply of second bias fabric around said second rubber layer, to obtain a belt sleeve, the number of plies of second bias fabric being equal to the number of plies of first bias fabric; (f) heating said belt sleeve under pressure; and (g) cutting said belt sleeve obliquely so that V-belts having a trapezoid section and V-belts having an inverted trapezoid section are alternately obtained, wherein the thickness of said second rubber layer is larger than that of said first rubber layer, whereby a line connecting the centers of said cords laterally of said belt is inwardly displaced from the center line of said belt by 2 to 20% of the thickness of said belt.

10. A method as claimed in claim 9, wherein said bias fabric has warps and wefts which form a cross angle of 90 to 150 degrees, and said bias fabric is wound in a plurality of plys on said cylindrical mandrel in such a manner that the bisector of said cross angle is substantially in parallel with the circumferential direction of said cylindrical mandrel.

11. A method as claimed in claim 9, wherein each of said first and second rubber layers is a short fiber reinforced rubber layer which is obtained by mixing short fibers elected from the group consisting of natural fibers and synthetic fibers in a rubber material whereby said short fibers extend in the widthwise direction of said V-belt.

12. A method as claimed in claim 11 wherein said cord is made of fibers selected from the group consisting of polyester fibers and polyamide fibers, and said cord is subjected to heat treatment at 200° to 240° C. and to adhesion treatment to be low in elongation and high in strength.

13. A method as claimed in claim 11 wherein each of said first and second adhesion rubber layers is in the range of 0.3 to 1.0 mm in thickness, and said cord is a layer interposed between said first and second adhesion rubber layers.

* * * * *